United States Patent
Malardier-Jugroot et al.

(10) Patent No.: US 9,849,448 B2
(45) Date of Patent: Dec. 26, 2017

(54) POLYMER-SUPPORTED METAL NANOPARTICLES, PROCESS FOR PRODUCTION THEREOF AND POLYMERIC NANOREACTORS PRODUCED THEREFROM

(71) Applicant: Her Majesty the Queen in Right of Canada, as represented by the Minister of National Defence, Ottawa (CA)

(72) Inventors: Cecile Malardier-Jugroot, Kingston (CA); Michael Nelson Groves, Kingston (CA); Manish Jugroot, Kingston (CA)

(73) Assignee: HER MAJESTY THE QUEEN IN RIGHT OF CANADA, Ottawa (CA)

( * ) Notice: Subject to any disclaimer, the term of this patent is extended or adjusted under 35 U.S.C. 154(b) by 0 days.

(21) Appl. No.: 14/912,711

(22) PCT Filed: Aug. 23, 2013

(86) PCT No.: PCT/CA2013/000738
§ 371 (c)(1),
(2) Date: Feb. 18, 2016

(87) PCT Pub. No.: WO2015/024093
PCT Pub. Date: Feb. 26, 2015

(65) Prior Publication Data
US 2016/0199813 A1    Jul. 14, 2016

(51) Int. Cl.
*B01J 35/00*    (2006.01)
*B01J 23/52*    (2006.01)
(Continued)

(52) U.S. Cl.
CPC ......... *B01J 35/006* (2013.01); *B01J 19/0093* (2013.01); *B01J 23/42* (2013.01);
(Continued)

(58) Field of Classification Search
CPC ..................................................... B01J 35/006
See application file for complete search history.

(56) References Cited

U.S. PATENT DOCUMENTS

2008/0265219 A1    10/2008    Whitehead et al.

FOREIGN PATENT DOCUMENTS

WO    2008/127396 A2    10/2008

OTHER PUBLICATIONS

Mendoza et al, In situ synthesis and alignment of Au nanoparticles with hexagonally packed cylindrical domains of diblock copolymers in bulk, 2009, Languir, 25(16), pp. 9571-9578.*
Bockstaller MR, et al. J. Am. Chem. Soc. 2003, 125, 5276-5277.
Abstract of Chan ASW et al. Conformational analysis of alternating copolymers and their association into nanoarchitectures. Nanotech 2009 vol. 2, pp. 439-442.
Abstract of Chan ASW et al. Synthesis and characterization of polypyrrole nanowires using alternating amphiphilic copolymer nanotubes as templates. Nanotech Conference & Expo, May 3-7, 2009, Houston, TX.
(Continued)

*Primary Examiner* — Melvin C Mayes
*Assistant Examiner* — Stefanie Cohen
(74) *Attorney, Agent, or Firm* — Brunet & Co. Ltd.; Robert A. H. Brunet; Hans Koenig

(57) ABSTRACT

A process for producing polymer-supported metal nanoparticles involves confinement of metal nanoparticles in polymeric nanotubes or nanosheets in an aqueous environment using hydrophobic reactants. Metal nanoparticles supported in the polymeric nanotubes or nanosheets are substantially monodisperse and have an average particle size of 4 nm or less. The polymer-supported metal nanoparticles are useful in fuel cells, sensors, bioanalysis, biological labeling or semi-conductors, especially as catalysts.

8 Claims, 4 Drawing Sheets

(51) Int. Cl.

| | | |
|---|---|---|
| *B01J 35/02* | (2006.01) | |
| *B01J 37/04* | (2006.01) | |
| *B01J 37/03* | (2006.01) | |
| *B01J 37/16* | (2006.01) | |
| *B01J 23/42* | (2006.01) | |
| *B82Y 30/00* | (2011.01) | |
| *B01J 31/06* | (2006.01) | |
| *H01B 1/12* | (2006.01) | |
| *B01J 19/00* | (2006.01) | |
| *C08L 35/00* | (2006.01) | |
| *C08L 35/06* | (2006.01) | |

(52) U.S. Cl.
CPC ............ *B01J 23/52* (2013.01); *B01J 31/063* (2013.01); *B01J 35/002* (2013.01); *B01J 35/0013* (2013.01); *B01J 35/023* (2013.01); *B01J 37/031* (2013.01); *B01J 37/04* (2013.01); *B01J 37/16* (2013.01); *B82Y 30/00* (2013.01); *H01B 1/127* (2013.01); *B01J 2219/00833* (2013.01); *B01J 2219/00835* (2013.01); *B01J 2219/00846* (2013.01); *B01J 2219/00864* (2013.01); *B01J 2231/14* (2013.01); *B01J 2531/002* (2013.01); *B01J 2531/008* (2013.01); *C08L 35/00* (2013.01); *C08L 35/06* (2013.01)

(56) References Cited

OTHER PUBLICATIONS

Abstract of Chan ASW et al. Self-assembly of alternating copolymers and the role of hydrophobic interactions: characterisation by molecular modelling. Molecular Simulation. 37(8), 2011, pp. 701-709.
Abstract of Chan XLA, et al. Environmental Friendly Synthesis of Polypyrrole within polymeric Nanotemplates-mechanism of polypyrrole synthesis. Nanotech Conference & Expo, Jun. 21-24, 2010, Anaheim, CA.
Kim SH et al. Macromolecules. 2006, 39, 8473-8479.
Li X, et al. Macromolecules. 2013, 46, 2258-2266.
Malardier-Jugroot, et al. Characterisation of a novel self-association of an alternating copolymer into nanotubes in solution. NSTI-Nanotech 2004, www.nsti.org, ISBN 0-9728422-9-2 vol. 3, 2004.
Mayer ABR, et al. Journal of Macromolecular Science, Part A: Pure and Applied Chemistry, 33:S7-S8, 451-459.
Mayer ABR, et al. Polymer Journal, 30(3), 197-205 (1998).
Mendoza C, et al. Langmuir. (2009), 25(16), 9571-9578.
International Search Report and Written Opinion for PCT/CA2013/000738 dated May 8, 2014.
Extended European Search Report dated Jun. 6, 2017 on European application 13891662.2.
Lazzara DT et al. European Polymer Journal. 45 (2009) 1883-1890.
Mayer A, et al. Colloid Polym Sci 276:769-779 (1998).
Graeser M, et al. Macromolecules. 2007, 40, 6032-6039.
McTaggart M, et al. Chemical Physical Letters. 636 (2015) 221-227.
McTaggart M, et al. Chemical Physical Letters. 636 (2015) 216-220.

* cited by examiner

POLYMER-SUPPORTED METAL NANOPARTICLES, PROCESS FOR PRODUCTION THEREOF AND POLYMERIC NANOREACTORS PRODUCED THEREFROM

CROSS-REFERENCE TO RELATED APPLICATIONS

This application is a national phase entry of International Patent Application PCT/CA2013/000738 filed Aug. 23, 2013, the entire contents of which is herein incorporated by reference.

FIELD

This application relates to polymer-supported metal nanoparticles, particularly to metal nanoparticles supported in polymeric nanotubes or nanosheets, and to a process for producing such polymer-supported metal nanoparticles.

BACKGROUND

Nanoparticles are small objects having diameters less than 1 micron that behave as a whole unit with respect to transport and properties. Nanoclusters are nanoparticles having at least one dimension between 1 and 10 nanometers and a narrow size distribution. Metal nanocatalysts are high surface-to-volume metal nanoparticles, particularly metal nanoclusters, useful for catalyzing many different reactions. Metal nanocatalysts have higher catalytic activity than bulk metal structures comprising the same metal, and may be synthesized in a variety of shapes that can have an effect on their relative activities. The preparation of metal nanocatalysts in the form of nanoclusters where the size, morphology and properties of the nanoclusters may be controlled by designed synthesis may have applications in a variety of high technology fields such as sensing, bioanalysis, biological labeling and semi-conductors. However, control of the size and morphology of particles and the nanoscale level is challenging.

Several methods have been developed recently to control the synthesis of metal nanoclusters including incipient wetness impregnation, electron beam lithography, sol-gel, evaporation methods, coprecipitation and colloidal synthesis with block copolymers or dendrimers. The methods leading to the most reliable size distribution (near-monodisperse) are electron beam lithography, evaporation methods onto oxide support and colloidal synthesis. However, electron beam lithography must be performed in a very controlled environment leading to a very expensive material. This is also the case with evaporation methods in which the very controlled environment involves ultra-high-vacuum. The colloidal approach may be performed with a polymer matrix allowing production of nanoparticles with a monodisperse size distribution, but the metal nanoclusters so produced are synthesized within a polymer shell which limits catalytic activity as 100% of the surface of the nanocluster is in contact with the polymer. The colloidal method also generally requires the use of a reducing agent to obtain a metal nanocluster from metal salt precursors incorporated inside the matrix.

In colloidal synthesis, the most common method of reducing metal salt precursors is by chemical reduction including alcohol reduction, hydrogen reduction and sodium borohydride reduction. Other reduction techniques include electrochemical, photochemical and sonochemical methods. These methods are often expensive and not environmentally friendly. The use of reducing agents may also reduce the efficiency of the catalysts.

In addition, macromolecular crowding and spatial confinement has been shown to enhance reactions depending on the relative sizes and shapes of the concentrated crowding species and on the diluted reactants and products. In general macromolecular crowding is expected to increase reaction rates that are slow, transition state-limited association reactions, and decrease the reaction rate of fast, diffusion-limited association reactions. For example, spatial confinement physically restricts the available conformations that a protein can form, which can make the folded state more favorable. Macromolecular crowding can also yield the same outcome but since the boundary is not rigid, more conformations are available. Another consideration is the electrical properties of the confining media. The size and shape of the confining body can lead to a reciprocal optimization of the van der Waals interaction between the molecules and the structure. This non-covalent interaction can lead to conformational changes that increase catalytic activity in zeolites and the reduction of iron oxide in carbon nanotubes, for example.

There remains a need for environmentally friendly methods of synthesizing monodisperse metal nanoclusters that are catalytically active and available for use as a catalyst.

SUMMARY

A process for producing polymer-supported metal nanoparticles involves confinement of metal nanoparticles in polymeric nanotubes or nanosheets in an aqueous environment using hydrophobic reactants. Metal nanoparticles supported in the polymeric nanotubes or nanosheets are substantially monodisperse and have an average particle size of 4 nm or less.

Thus, there is provided a process for producing polymer-supported metal nanoparticles comprising: mixing a hydrophobic metal precursor compound in an aqueous non-reducing solvent in the presence of an organic polymer that self-organizes into nanotubes or nanosheets, the nanotubes or nanosheets confining the metal precursor compound therein; and, allowing the metal precursor compound to reduce within the nanotubes or nanosheets without addition of reducing agent to form metal nanoparticles confined in the nanotubes or nanosheets.

There is also provided polymer-supported metal nanoparticles comprising monodisperse metal nanoparticles having an average particle diameter of 4 nm or less confined in nanotubes or nanosheets, the nanotubes or nanosheets comprising an organic polymer.

There is also provided a catalyst comprising the polymer-supported metal nanoparticle.

Nanotubes or nanosheets, collectively called nanotemplates, may be produced from organic polymers that self-organize under certain conditions to form the nanotemplates. In one aspect, the organic polymer may be an amphiphilic alternating copolymer. Amphiphilic alternating copolymers include, for example, poly(styrene-alt-maleic anhydride) (SMA) and poly(isobutylene-alt-maleic anhydride) (IMA). The nanotubes or nanosheets have very small cavities. The nanotubes may have an interior diameter of less than about 4 nm, or about 1-3 nm, for example about 2.8 nm. The nanosheets may have a sheet spacing of less than about 4 nm, or about 1-3 nm, for example about 2 nm. For example, SMA is an amphiphilic alternating copolymer that forms nanotubes having an interior diameter of about 2.8 nm in water at pH 7, while IMA is an amphiphilic alternating copolymer that forms nanosheets having a sheet spacing of about 2 nm in water at pH 7.

Metal nanoparticles, especially nanoclusters, may comprise an active metal, for example a catalytically active metal. The nanoparticles may comprise a pure active metal or a mixture of the active metal with another metal, for example as in an alloy. The other metal in the mixture may be active as well, or may be inactive. Active metals include, for example, platinum, palladium, nickel, rhodium, ruthenium, gold, silver, cobalt, copper, iridium, manganese and iron. The active metal is preferably in a 0 oxidation state. The active metal preferably comprises platinum, gold or a platinum-gold alloy. The active metal especially preferably comprises platinum.

The metal nanoparticles confined in the nanotemplate have an average particle size (e.g. diameter) of about 4 nm or less, preferably about 3 nm or less, for example from about 1 nm to about 3 nm. The metal nanoparticles are preferably monodisperse. A collection of nanoparticles is called monodisperse or uniform if the nanoparticles have the substantially same size, shape, or mass. Monodisperse metal nanoparticles may have a narrow particle size distribution of about ±20% or less. With an average particle size of about 4 nm or less, there may be an error in the average particle size of about 0.15 nm or less at a 95% confidence level.

The effect of confinement of the metal nanoparticles within the nanotemplates formed by the self-organization of the organic polymer induces a reaction which is prevented in the bulk. Therefore, the confinement effect observed in these nanotemplates enhances the kinetics of reactions occurring inside a nanoreactor composed of the polymeric nanotemplate containing the metal nanoparticles. A nanoreactor is defined as an active metal nanoparticle within or complexed with a polymeric nanotemplate. The nanoreactors have very well-defined structures with nanoparticles of very well-defines sizes and morphologies that provide very high surface areas for catalyzing reactions within the nanoreactor. Products produced in the nanoreactors also have very well controlled sizes and morphologies, which are important for many applications such as nanoelectronics, sensors and fuel cells. Thus, the very high surface areas of the nanoparticles and the confinement effect provided by the nanotemplate lead to nanoreactors of exceptional activity with a significant increase in kinetics.

The process for producing polymer-supported metal nanoparticles comprises mixing a hydrophobic metal precursor compound in an aqueous non-reducing solvent in the presence of an organic polymer that self-organizes into nanotubes or nanosheets, the nanotubes or nanosheets confining the metal precursor compound therein. In addition, the effect of confinement permits reduction of confined metal precursor compound to the metal nanoparticles without external reducing agent, making the process more environmentally friendly.

The hydrophobic metal precursor compound may be a molecular compound of an ion of the catalytically active metal and one or more ligands. The ion is preferably a cation, for example a cation in the +1, +2, +3, +4, +5, +6 or +7 oxidation state. The ligand may be neutral or an ion, particularly an anion, and there should be sufficient ionic ligands to balance any charge on the metal ion. The metal precursor compound may be a salt of a metal cation and one or more anionic ligands. Some examples of ligands include halides (e.g. chloride, bromide or iodide) and hydrophobic organic ligands. Hydrophobic organic ligands may comprise reactants used in the synthesis of metal catalysts. Some examples of hydrophobic organic ligands are cis-dichlorobis (pyridine) and dichloro(dicyclopentadienyl). Where there is more than one ligand, the ligands may be the same or different. The metal precursor compound is hydrophobic having a relatively low solubility in aqueous medium.

The solvent is an aqueous medium free from reducing agents for the metal precursor compound. The aqueous medium comprises water and may comprise co-solvents, for example dimethylsulfoxide (DMSO), dimethyformamide (DMF) or other organic solvents, provided the co-solvent is not a reducing agent for the metal precursor compound. For an environmentally friendly process, the aqueous medium preferably does not contain a co-solvent. An important aspect of the process is that organic solvents, for example benzene, toluene and acetone, are not required, thus the process is more environmentally friendly and less toxic.

Self-organization (e.g. self-assembly) of the organic polymer into nanotemplates (nanotubes or nanosheets) may be accomplished in the aqueous medium by appropriately adjusting one or more process parameters, for example pH, temperature, ionic strength, etc. Adjusting pH is an important way in which the organic polymer may be induced to self-organize. A neutral pH, for example a pH in a range of from about 6.5 to 7.5, may be suitable. Adjusting the pH to about 7 may be particularly useful, especially for amphiphilic alternating copolymers. The pH may be adjusted by the addition of acid or base as needed. Acids may include HCl, $H_2SO_4$ and the like. Bases may include NaOH, KOH and the like. The process is preferably conducted at room temperature, for example at a temperature in a range from about 15° C. to about 75° C., or about 15° C. to about 50° C., or about 15° C. to about 30° C., or about 20° C. to about 25° C.).

Reduction of the metal precursor compound confined in the nanotubes or nanosheets occurs spontaneously in situ without addition of reducing agent. Because the solvent is non-reducing medium, the reduction is also performed in the absence of reducing agent that may have been trapped during the self-organization of the organic polymer. Reduction of the metal precursor compound is a result of confinement within the nanotubes or nanosheets, leading to the formation of monodisperse, small metal nanoparticles having uniform shape. The reduction may be photo-assisted, i.e. light may enhance the reduction of the metal precursor compound. That a reducing agent is not required in this process leads to a more environmentally friendly process. Further, the reduction spontaneously in situ of metal precursor compounds due to the confinement effect in nanotubes or nanosheets is more general than in the colloidal approach permitting reduction in situ of a greater range of metal precursor compounds, for example platinum or gold precursor compounds, especially platinum precursor compounds, which are not reducible in situ in colloidal nanoreactors without the presence of an external or additional reducing agent.

Further, the polymer-supported metal nanoparticles are well dispersed or solubilized in and stable in the aqueous solvent. This stability in aqueous environments is a significant advantage over the colloidal approach. Due to the hydrophobic nature of the metal precursor compound, when a reducing agent is used to reduce the metal precursor compound, the colloid is also reduced and the complex will precipitate. However, organic matter of the colloid will interact with the metal nanoparticles, which in turn would become less active as the surface area that could be used for reaction sites would decrease. In the present process, the nanoreactors stay in solution, even under different pH conditions (pH 1 to 14), which allows the metal nanoparticles to be in contact with reactants without decreasing accessible surface area or catalytic efficiency and permits different reactions to be catalyzed within the active nanoreactor. The present process may produce support-less catalysts, which can benefit from the confinement effect in reactions that take place in aqueous environments. Furthermore, metal nanoparticle synthesis occurs in a biocompatible environment, which expands its range to include biological applications.

In a particularly preferred aspect, the organic polymer may be dispersed (e.g. solubilized) in the aqueous non-reducing medium, the pH may be adjusted to about 7 and then the hydrophobic metal precursor compound may be added to the dispersion. The hydrophobic metal precursor compound becomes solubilized inside the nanotubes or nanosheets as the nanotubes or nanosheets form, and the nanotubes or nanosheets remain dispersed or dissolved in the aqueous medium with the metal precursor compound inside them. The metal precursor compound then undergoes reduction within the confined space of the nanotubes or nanosheets to form the metal nanoparticles without the use of external or additional reducing agent. A polymeric nanoreactor of high surface area is thereby formed, the nanoreactor capable of catalyzing various reactions.

The polymer-supported metal nanoparticles may be useful in fuel cells, sensors, bioanalysis, biological labeling or semi-conductors. The polymer-supported metal nanoparticles may permit development of very small and very sensitive sensors, very active catalysts for use for example in fuel cells, semi-conductors where shape at the nanoscale is now crucial to increase the number of processors in a very limited space, asymmetric synthesis for application in drug delivery, and bioanalysis, where sensitivity at the nanoscale permits development of very sensitive devices.

Further, there is a need for development of light power sources for remote locations. The use of the present nanoscale catalysts would reduce the amount of metal and therefore the weight and the size of fuel cells making the fuel cells very good candidates for power sources for remote locations. Furthermore, the polymer-supported metal nanoparticles may lead to the production of sensors at the nanoscale level allowing the sensor to be integrated within a suit without increasing the weight of the suit and with a very high sensitivity. The development of sensors integrated into suits of various kinds is also an active research area for many applications.

Further features will be described or will become apparent in the course of the following detailed description.

BRIEF DESCRIPTION OF THE DRAWINGS

For clearer understanding, preferred embodiments will now be described in detail by way of example, with reference to the accompanying drawings, in which.

DETAILED DESCRIPTION

Poly(styrene-alt-maleic anhydride) (SMA) is an amphiphilic alternating copolymer that forms nanotubes with a 2.8 nm interior diameter in water at pH 7. The most stable conformation obtained for the self-association at pH 7 is a tubular structure in which eight SMA molecules make one twist of a helix. The tubes can grow in length by continued regular stacking of benzene rings. The nanotubes have inner and outer diameters of about 2.8 nm and 4.1 nm, respectively. The hydrophobic groups are mainly located inside the nanotube and the hydrophilic groups are mainly on the exterior surface of the nanotube. Thus, SMA nanotubes are capable of solubilizing hydrophobic compounds inside the nanotube, while themselves being solubilizable in aqueous media due to the hydrophilic groups on the exterior surface of the nanotube.

Poly(isobutylene-alt-maleic anhydride) (IMA) is an amphiphilic alternating copolymer that forms nanosheets with a sheet spacing of about 2 nm in water at pH 7. IMA copolymer at pH 7 forms double layer sheets in which the outer surfaces are hydrophilic and the center gap is hydrophobic. Thus, IMA nanosheets are capable of solubilizing hydrophobic compounds in the center gap of the nanosheet, while themselves being solubilizable in aqueous media due to the hydrophilic groups on the exterior surface of the nanosheet.

Example 1: Preparation of SMA-Based Nanoreactors with Pt 1 wt % SMA solutions were prepared by mixing poly (styrene-alt-maleic anhydride), partial methyl ester with an average Mw=350;000 (Sigma-Aldrich), with deionized water. An aqueous solution of NaOH was used to raise the pH to 7 and the mixture was sonicated until the polymer had completely dissolved. 0.1 g of platinum (II) chloride, 98% ($PtCl_2$, Sigma-Aldrich) was weighed and mixed into 3.0 g of the 1 wt % SMA solution. The mixture was then sonicated for 90 minutes at room temperature to break up aggregated $PtCl_2$ which would form when mixed into the solution. The sample was left to sit for 1 week until the colour of the solution start to change from a pale green to black with the formation of a precipitate. The precipitate is an excess of $PtCl_2$ used to ensure a complete solubilisation within the polymeric nanotemplate. This colour change was equivalent to the colour change observed when an identical $PtCl_2$/SMA solution was reduced with 1 mL of a 0.5 M $NaBH_4$ solution, thereby confirming that reduction of the $PtCl_2$ can occur spontaneously in the interior of the SMA nanotubes without the need for additional reducing agent.

Figure 1:
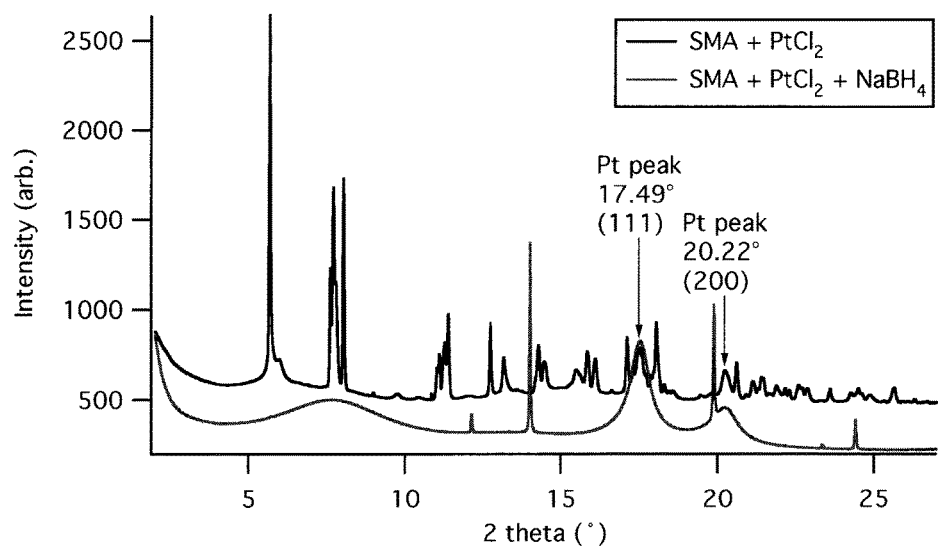
FIG. 1 depicts X-ray diffraction (XRD) plots for a sample of 1 wt % SMA and $PtCl_2$ without additional reducing agent (upper plot) and a sample of 1 wt % SMA and $PtCl_2$ with additional reducing agent ($NaBH_4$) (lower plot)

Further confirmation that the platinum precursor compound $PtCl_2$ is reduced in situ in the SMA nanotubes without the addition of additional reducing agent is evident from X-ray diffraction (XRD) (FIG. 1). The XRD spectra were obtained at a wavelength of 0.6888 Å. Peaks corresponding to the Pt (111) crystal face at 17.49° and the (200) crystal face at 20.22° (JCPDS 04-0802) are evident in both the plot for the in situ reduction (upper plot) and the $NaBH_4$ reduction (lower plot). This shows that Pt nanoparticles are present in the sample where no NaBH$_4$ reduction occurred, which can only be a result of spontaneous reduction of PtCl$_2$ in the SMA nanotubes.

Figure 2A:
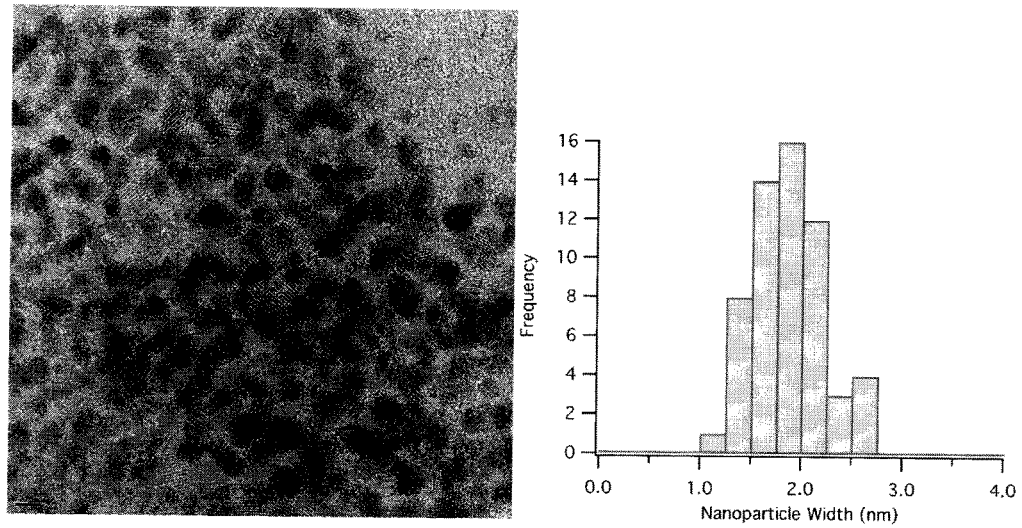
FIG. 2A depicts a Transmission Electron Micrograph (TEM) image of platinum (Pt) nanoparticles formed by in situ reduction of $PtCl_2$ in SMA nanotubes, alongside a graph showing the particle width distribution of the Pt nanoparticles so formed; and, FIG. 2B depicts a Transmission Electron Micrograph (TEM) image of platinum (Pt) nanoparticles formed by $NaBH_4$ reduction of $PtCl_2$ in SMA nanotubes, alongside a graph showing the particle width distribution of the Pt nanoparticles so formed.
Figure 2B:
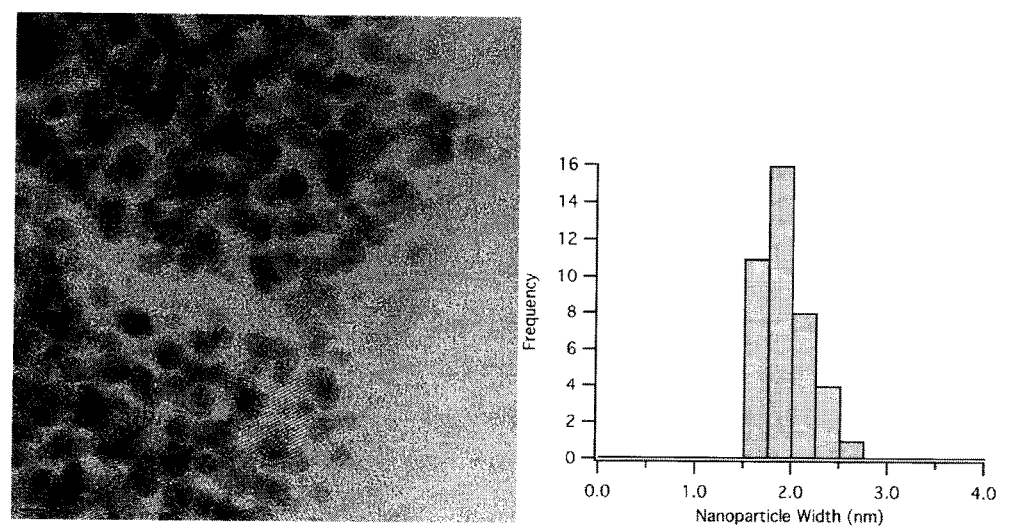

Particle size of the Pt nanoparticles may be determined from Transmission Electron Microscopy (TEM). TEM was performed at the Canadian Centre for Electron Microscopy on both the sample of Pt-SMA obtained from spontaneous in situ reduction (FIG. 2A) and the sample obtained from NaBH$_4$ reduction (FIG. 2B). The dominant crystal face was determined from the TEM images and the d-spacing determined. The average d-spacing for the Pt nanoparticles in the NaBH$_4$ reduced sample was 0.198±0.007 nm, while the average d-spacing for the Pt nanoparticles in the spontaneously reduced sample was 0.197±0.007 nm. There is no significant difference between the two samples and they correspond to the (200) miller index. From the graphs in FIG. 2A and FIG. 2B showing the particle width distribution of the Pt nanoparticles, it is evident that all of the particles have a width less than about 3 nm and that the average particle width is less than about 2 nm. Both samples comprise nanoparticles having an average particle size of 1.89±0.09 nm at the 95% confidence level.

Example 2: Use of Pt-SMA Nanoreactors in Catalysis

Figure 3A:
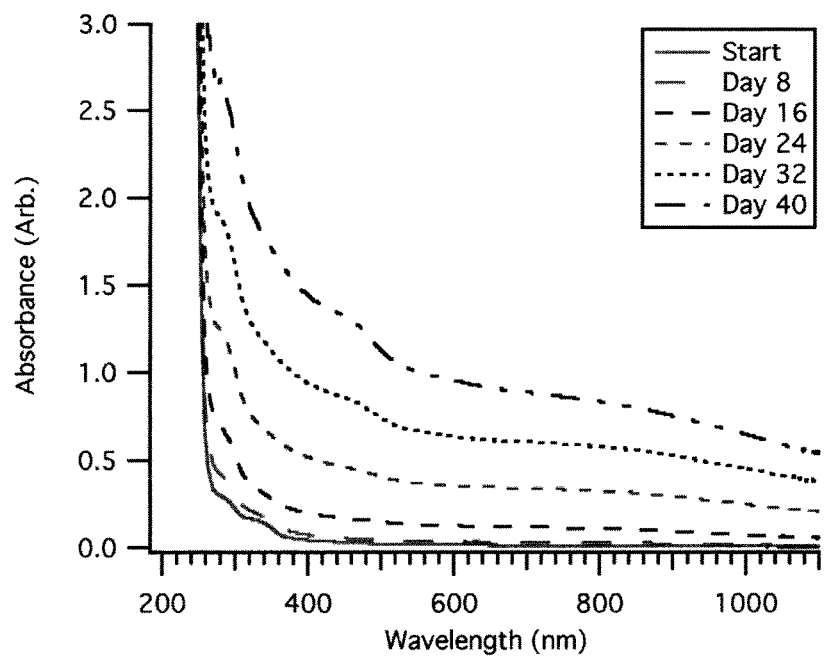
FIG. 3A and FIG. 3B depict ultraviolet-visible (UV-Vis) spectra tracking polymerization of pyrrole without Pt (FIG. 3A) and with Pt (FIG. 3B) in a hydrophobic cavity of SMA nanotubes.
Figure 3B:
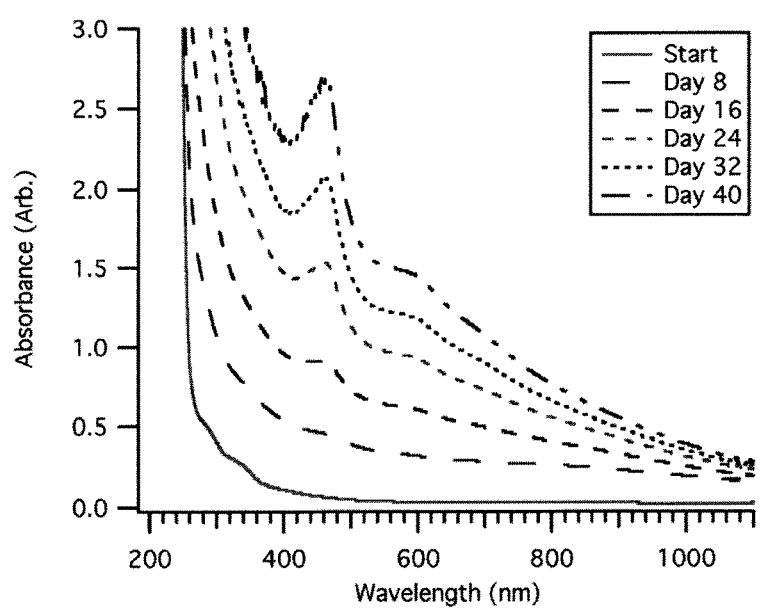

With reference to FIG. 3A and FIG. 3B, enhanced catalytic activity of the Pt-SMA nanoreactor of Example 1 was demonstrated by using UV-Vis spectroscopy to monitor the polymerization of pyrrole within the polymeric nanotemplate. FIGS. 3A and 3B demonstrate the efficiency of the Pt catalyst inside the SMA nanotemplate in aqueous solution at neutral pH. SMA alone has previously been reported to spontaneously trigger the polymerization of pyrrole due to the confinement effect, but the reaction requires about 1 month to show any measureable change. The high surface-to-volume Pt nanoparticles in the SMA polymer nanotemplate were used to help catalyze the pyrrole polymerization under the confinement effect. It was found that with the presence of Pt nanoparticles in the SMA nanotubes, the polymerization of pyrrole requires only a third of the time to start to show a measurable change according to UV-Vis spectroscopy. Thus, the start of the characteristic polypyrrole peak occurs after only 8 days with the presence of the Pt nanoparticles in 1 wt % SMA. This peak does not appear for the 1 wt % SMA sample without Pt nanoparticles until 24 days after the start of the reaction. This demonstrates the additional catalytic activity of the SMA nanoreactor with the inclusion of Pt nanoparticles.

Example 3: Preparation of SMA-based Nanoreactors with Au

Figure 4:
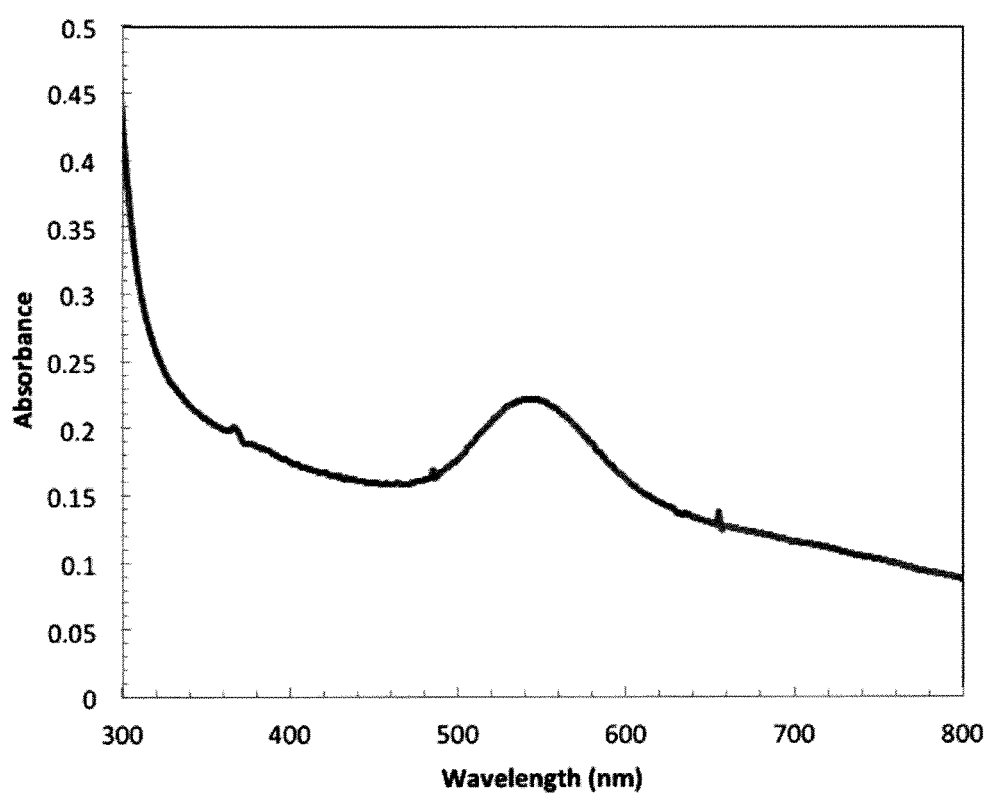
FIG. 4 depicts an ultraviolet-visible (UV-Vis) spectrum of gold (Au) nanoparticles formed by in situ reduction of AuCl in SMA nanotubes.

The procedure described in Example 1 was adapted to prepare Au-SMA nanoreactors, except that gold (I) chloride (AuCl) replaced PtCl$_2$ as the precursor compound. FIG. 4 is a UV-Vis spectrum of gold nanoparticles prepared in this example, where the peak at 550 nm in the spectrum is characteristic of Au nanoparticles.

REFERENCES

The contents of the entirety of each of which are incorporated by this reference.

Chan A S W, Groves M, Malardier-Jugroot. (2009) Conformational Analysis of Alternating Copolymers and their Association into Nanoarchitectures. NSTI-Nanotech 2009, Vol. 2, 2009.

Chan A S W, Groves M, Malardier-Jugroot. (2009) Synthesis and Characterization of Polypyrrole Nanowires Using Alternating Amphiphilic Copolymer Nanotubes as Templates. Nanotech Conference & Expo 2009. Houston, Tex., May 3-7, 2009.

Chan A S W, Groves M, Malardier-Jugroot. (2010) Environmentally Friendly Synthesis of Polypyrrole within Polymeric Nanotemplates—Mechanism of Polypyrrole Synthesis. Nanotech Conference & Expo 2010. Anaheim, Calif., Jul. 21-24, 2010.

Malardier-Jugroot C, van de Ven T G M, Whitehead M A. (2005) Characterisation of a novel self-association of an alternating copolymer into nanotubes in solution. NSTI-Nanotech 2004, ISBN 0-9728422-9-2 Vol. 3, 2004.

Mayer A, Antonietti M. (1998) Investigation of polymer-protected noble metal nanoparticles by transmission electron microscopy: control of particle morphology and shape. *Colloid Polym Sci.* 276, 769-779.

Lazzara T D, Whitehead M A, van de Ven T G M. (2009) Linear nano-templates of styrene and maleic anhydride alternating copolymers. *European Polymer Journal.* 45, 1883-1890.

Li X, Malardier-Jugroot C. (2013) Confinement Effect in the Synthesis of Polypyrrole within Polymeric Templates in Aqueous Environments. *Macromolecules.* 46, 2258-2266.

Whitehead M A, Malardier-Jugroot C, Van De Ven T G M, Lazzara T D. (2008) Method for Fabricating Intrinsically Conducting Polymer Nanorods. US 2008/0265219 published Oct. 30, 2008.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A process for producing polymer-supported metal nanoparticles comprising: mixing a hydrophobic metal precursor compound in an aqueous non-reducing solvent in the presence of an organic polymer that self-organizes into nanotubes or nanosheets, the nanotubes or nanosheets confining the metal precursor compound therein; and, allowing the metal precursor compound to reduce within the nanotubes or nanosheets without addition of reducing agent to form metal nanoparticles confined in the nanotubes or nanosheets.

2. The process according to claim 1, wherein the metal nanoparticles comprise platinum.

3. The process according to claim 1, wherein the metal nanoparticles comprise gold.

4. The process according to claim 2, wherein the hydrophobic metal precursor compound comprises PtCl$_2$.

5. The process according to claim 1, wherein the organic polymer comprises an amphiphilic alternating copolymer.

6. The process according to claim 1, wherein the organic polymer comprises poly(styrene-alt-maleic anhydride) (SMA) that self-organize into nanotubes.

7. The process according to claim 1, wherein the organic polymer comprises poly(isobutylene-alt-maleic anhydride) (IMA) that self-organize into nanosheets.

8. The process according to claim 1, wherein the organic polymer is dispersed in the aqueous non-reducing solvent, pH of the solvent is adjusted to 7, and then the hydrophobic metal precursor compound is added to the dispersion.

* * * * *